June 26, 1923.

M. C. SCHWEINERT

TOOL FOR TIRE VALVES OR THE LIKE

Original Filed Feb. 24, 1915

1,459,751

INVENTOR:
Maximilian Charles Schweinert
By Attorneys,

Patented June 26, 1923.

1,459,751

UNITED STATES PATENT OFFICE.

MAXIMILIAN CHARLES SCHWEINERT, OF NEW YORK, N. Y.

TOOL FOR TIRE VALVES OR THE LIKE.

Original application filed February 24, 1915, Serial No. 10,346. Divided and this application filed May 28, 1920. Serial No. 384,907.

*To all whom it may concern:*

Be it known that I, MAXIMILIAN CHARLES SCHWEINERT, a citizen of the United States of America, residing in the borough of Manhattan, city, county, and State of New York, have invented certain new and useful Improvements in Tools for Tire Valves or the like, of which the following is a specification.

This application is a division of my application filed February 24, 1915, Serial No. 10,346.

This invention relates to tools for tire valves or the like, and aims to provide certain improvements therein.

The invention is particularly directed to the formation of a screwthreading tap which is fixed to the handle of the valve tool, preferably by forming a hole in the handle, and forcibly pressing the tap therein. The invention includes a tap especially adapted for this purpose.

The common method of forming a screwthreading tap is to start with a cylindrical bar of appropriate thickness and machine out a number of concavities in the forward or working end of the bar. These concavities, which extend lengthwise of the bar, leave projecting ridges of metal (usually four) in which the thread cutting portions of the tap are formed. The concavities perform the double function of removing the metal of the bar in such manner as to leave proper cutting edges on the cutting threads, and also to provide channels through which the chips may pass out of the hole being threaded when the device is in use. This method of forming a tap is expensive, since is requires considerable machine work, and has the further disadvantage that a considerable portion of the metal is wasted.

According to the present invention, I construct a tap by first drawing a rod or bar of any suitable length with channels extending the entire length of the bar. The bar is then preferably cut into proper lengths for the taps, and either end of each length is screw-threaded. Or, if desired, both ends thereof may be threaded. The threading portion forms the cutting portions of the taps, and after tempering, the tap is then ready for use.

It will be noted that the tap comprises a shank of undiminished cross-section, and a tap portion of less diameter than the shank, or in any event of not greater diameter. The handle is preferably provided with a hole of appropriate size, and the tap is driven into the hole until it assumes its ultimate position. During this operation the diminished diameter of the tap portion permits it to be passed through the hole in the handle, while, on the other hand, pressure can be exerted against the tap on the shank end. The peculiar cross-section of the shank enables it to bite into the metal of the handle to some extent, and thus strengthen the nonrotative connection between the two parts.

In the drawings, wherein I have shown one form of the invention,—

Figure 1:
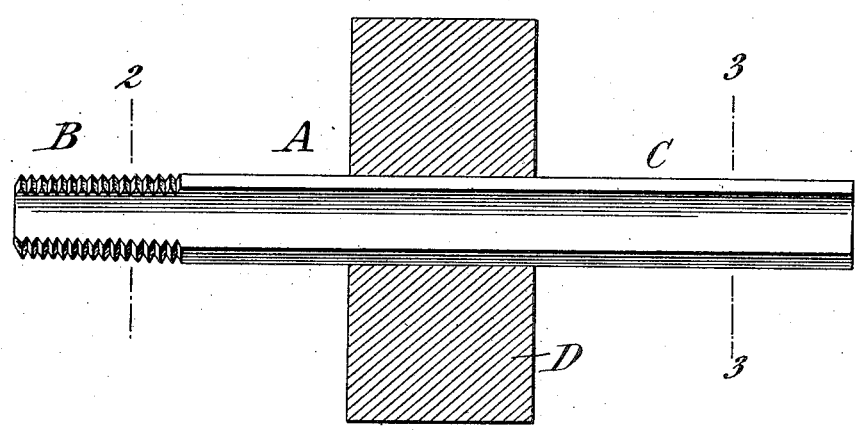
Figure 1 is a side elevation of a tap constructed in accordance with this invention, the handle being shown in section.

Referring to the drawings, let A indicate the tap as a whole. This comprises a cutting portion B and a shank portion C.

Figure 2:
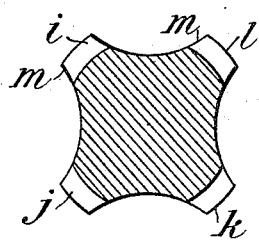
Fig. 2 is a cross-section taken on the line 2—2 in Fig. 1.
Figure 3:
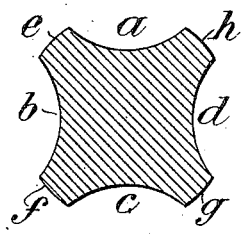
Fig. 3 is a cross-section taken on the line 3—3 in Fig. 1.

In practicing the invention I first draw or otherwise form a rod or bar of any suitable length which has such cross-section as may be desired in the formation of the cutting portion of the tap. Such a cross-section is indicated in Figure 3. Where the tap is to have four cutting faces, the rod is drawn with channels $a$, $b$, $c$ and $d$ throughout its entire length. This leaves projecting portions $e$, $f$, $g$ and $h$. This is a simple and economical operation easily performed in drawing the rod, and without material increase in the cost of the drawing operation. The rod may then be cut up into suitable lengths, and either end of the length thus formed is threaded by a suitable die, or, if desired, by any other thread cutting tool. A mutilated thread of slightly smaller diameter than the unthreaded shank portion of the tap is thus formed on the projecting portions $e$, $f$, $g$, $h$, as indicated in Figure 2, where the threaded portions are lettered $i$, $j$, $k$ and $l$. The advancing or cutting portions of the thread (indicated at $m$ in the case of a right-hand tap) are left in sharp condition and have such an angle as to properly cut the metal of the bore or hole when the tap is in use. If desired, in any case, these cutting edges may be sharpened by a grinding or dressing tool, which operation is a simple and inexpensive one, due to the fact that it is necessary to remove very little of the metal.

The shank end C of the tap also has the advantage that it is more easily engaged and firmly held than a tap having a rounded shank, since the chuck or other gripping device has a diversified exterior to press against, instead of a continuous and more or less smooth exterior, such as is presented by a round shank. At the same time the tool is properly centered, owing to the fact that the faces of the projecting ridges of the shank are equidistant from a common center and preferably coincide with a circle struck from such center. Another advantage which the tap of the present invention provides, is that it is capable of being fixedly secured to another part by driving it in a bore in the latter. Thus, in tire valve tools or the like, where the tap is fixed to a portion which serves as a handle (indicated at D in Fig. 1), it is only necessary to provide a hole in the handle and forcibly press the tool therein. The projections e, f, g, h provide a very strong frictional connection between the two parts.

In connecting the two parts together, the threaded end of tap can be pressed through the hole in the handle D, which is permitted by the slightly reduced diameter of the tap portion, and the shank portion may receive any pressure or blow desirable to effect the connection without in any way injuring the tap portion.

In the use of the tap, if the thread portion should break and it be desired to rethread the tap, this can be accomplished at any point in the length of the shank. Hence, if desired, such taps can be repaired and re-formed in a sufficiently cheap manner to render such repair operations economical. Or, if it be desired to form a cutting portion at each end of the tap, this involves only the threading of both ends.

What I claim is:—

1. A tap comprising a rod of channeled metal having a shank of uniform diameter, and having cutting threads formed at one end, said threaded end being of less diameter than said unthreaded portion, and the unthreaded shank being of undiminished dimensions.

2. In combination, two members, one of which is a tap, said tap comprising a rod of channeled metal having a shank of uniform diameter, and having cutting threads formed at one end, said threaded end being of less diameter than said unthreaded portion, said other member being adapted to fixedly hold said tap, and having a bore through which said tap is adapted to be driven, the lesser diameter of said threaded end permitting said tap to pass through said bore without injury to said threads, thereby enabling a driving fit to be made between said members by first introducing said threaded end into the bore and driving the tap at its end opposite its threaded end.

3. A tap comprising a rod of channeled metal of uniform diameter, having an unthreaded shank and cutting threads, said cutting threads being of no greater diameter than the shank.

In witness whereof, I have hereunto signed my name.

MAXIMILIAN CHARLES SCHWEINERT.